Dec. 22, 1970 I. G. YOUNG 3,550,057

SENSING ELEMENT

Filed Nov. 29, 1968

*INVENTOR.*
IRVING G. YOUNG

United States Patent Office 3,550,057
Patented Dec. 22, 1970

3,550,057

SENSING ELEMENT

Irving G. Young, Levittown, Pa., assignor to Honeywell Inc., Minneapolis, Minn., a corporation of Delaware Filed Nov. 29, 1968, Ser. No. 779,804
Int. Cl. H01c 13/00
U.S. Cl. 338—34 12 Claims

ABSTRACT OF THE DISCLOSURE

A moisture sensing element is provided by forming upon a metal base member an insulative oxide film and an adjacent moisture sensitive oxide film. The moisture sensitive and insulative oxide films are each formed by anodizing the metal base member in sulphuric acid solutions maintained, respectively, at first and second predetermined temperatures. A metal film is formed over the moisture sensitive oxide film and overlapped onto the insulative oxide film. Electrical terminals are connected, respectively, to the portion of the metal film which overlaps onto the insulative oxide film and to the metal base member.

The present invention relates to sensing elements, and more particularly to moisture or humidity sensing elements.

Heretofore, moisture or humidity sensing elements have been made by first anodizing a metal base member to form a moisture sensitive oxide film thereon, and then by evaporating a metal film permeable to moisture over this oxide film. Electrical terminals were connected to a point on the evaporated metal film and to the metal base member.

In such sensing elements, the impedance of the oxide film varied in proportion to the amount of moisture or humidity sensed, and the metal film and base member each served as electrodes. Electrical signals were applied to the electrical terminals of these sensing elements to generate output signals proportional to the impedance of the oxide film and thereby proportional to relatve humidity. One significant drawback inherent in the construction of such sensing elements, however, was that the point of connection of an electrical terminal to the evaporated metal film was necessarily located directly over the moisture sensitive oxide film. As a consequence, water tended to concentrate in the portions of the oxide films adjacent to these points of connection. These vapor concentrations, so-called water traps, when formed had the undesired effect of slowing the response time of such sensing elements.

To avoid the formation of water traps and to produce humidity sensing elements with a more rapid time of response, sensing elements were subsequently developed in which a portion of the surface area of the moisture sensitive oxide film was first sealed with an insulating overlay, such as a plastic overlay. Thereafter the metal film was evaporated over the unsealed portion of the oxide film and overlapped onto the insulative overlay. An electric terminal was then connected to the portion of the metal film overlapping onto the insulative overlay instead of to a point on the metal film located directly over the oxide film. A structural drawback, however, inherent with humidity sensing elements made in this manner was that the physical thickness of the insulating overlay caused a step to exist at the junction between the surfaces of the overlay and the unsealed oxide film. As a result, an irregularity was formed in the evaporated metal film at this junction point. This irregularity contributed an unwanted resistance to the metal film, thereby undesirably increasing the internal impedance of such sensing elements.

It is, accordingly, an object of the present invention to provide an improved moisture sensing element which obviates the disadvanatges of prior art sensing elements.

It is another object of the present invention to provide a moisture sensing element as set forth characterized by its rapid time of response, low internal resistance and durable construction.

It is additionally an object of the present invention to provide a moisture sensing element as set forth which has stable response characteristics that are substantially unaffected by the age of the sensing element or the temperature and pressure of the environment in which the sensing element is operated.

It is also an object of the present invention to provide a method for manufacturing an improved moisture sensing element of the type set forth.

In accomplishing these and other objects, there is provided in accordance with the present invention a moisture sensing element which exhibits a moisture responsive variable impedance characteristic. The sensing element is made by forming upon a metal base member an insulative oxide film and an adjacent moisture sensitive oxide film. The insulative and moisture sensitive oxide films are each formed by anodizing the metal base member, respectively, in a first and second acid solution maintained at first and second predetermined temperatures. The formation of the oxide layers is also controlled so that the adjacent insulative and moisture sensitive oxide films form a continuous interface and smooth junction with each other. A porous conductive film permeable to moisture is then formed over the moisture sensitive oxide film and overlapped onto the insulative oxide film. Electric terminals are connected, respectively, to the portion of the conductive film which overlaps onto the insulative oxide film and to the metal base member.

A better understanding of this invention may be had from the following detailed description when read in connection with the accompanying drawings in which.

Figure 1:
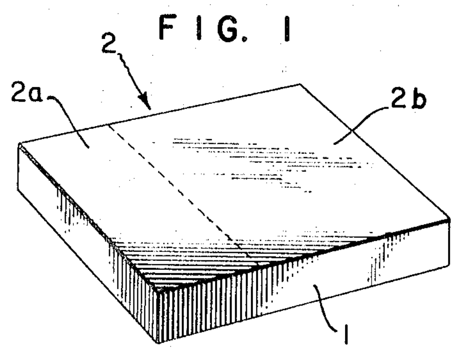
FIG. 1 is a perspective view of a metal base member.

Referring now to the drawings in more detail, FIGS. 1–4 are directed to a first embodiment of the present invention. FIG. 1 shows a rectangular metal base member 1 made from a substantailly pure piece of sheet aluminum. The base member 1 has an upper planar surface 2 which for purposes of this discussion is divided by a broken line into rectangular surface areas 2*a* and 2*b*.

To manufacture a moisture sensing element in accordance with the present invention, the entire surface area of the base member 1 except for the surface area 2*a* is covered with a first acid resistive coating or ink. The acid resistive ink used, for example, may be Nelco Blue Silk-Screen Modified Lacquer R–6614 (medium viscosity) manufactured by Chemical Products Corporation. This coating or ink may be applied to the base member 1 by silk-screening or other appropriate methods.

Figure 2:
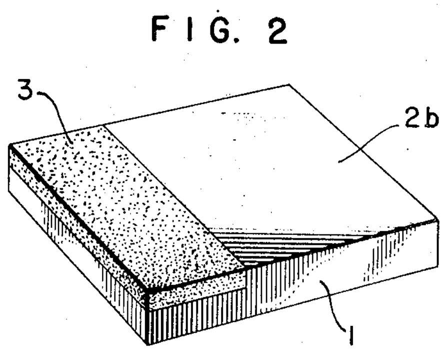
FIG. 2 is a perspective view of the base member of FIG. 1 with an insulative oxide film formed thereon.

The base member 1 is next submerged in a first sulfuric acid solution maintained at a constant temperature between the ranges of −5° C. to +5° C., for example at about 0° C., and having a specific gravity of 1.4. The aluminum base member 1 is then anodized to form upon the acid exposed surface area 2*a* an insulative oxide film 3, as shown in FIG. 2. The anodization step comprises passing an alternating current having a density of about 0.083 amp/in.$^2$ through the sulfuric acid solution while using the base member 1 as one electrode and another piece of aluminum as a counter electrode. This anodization step may be continued for about 30 minutes whereafter the base member 1 is rinsed with water to remove the first sulfuric acid solution therefrom, and rinsed with a solvent, such as acetone, to remove the first acid resistive coating therefrom. The base member 1 is then submerged in boiling distilled water for approximately thirty minutes to age and thereby stabilize the response characteristics of the insulative aluminum oxide film 3 now formed. The insulative oxide film 3 is characterized by being hard, non-porous and non-sensitive to moisture, pressure or temperature.

Figure 3:
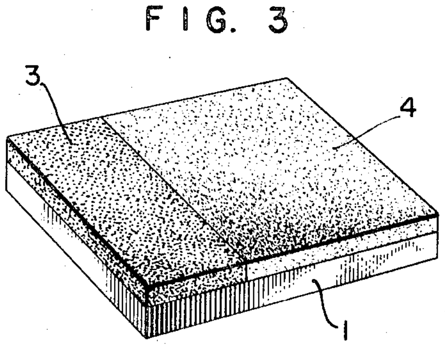
FIG. 3 is a perspective view of the base member of FIG. 2 with a moisture sensitive oxide film formed thereon.

The entire surface area of the base member 1, including the insulative oxide film 3, is now covered by silk-screening with a second acid resistive coating or ink, such as the Lacquer R–6614, before described, except that the surface area 2*b* is now left uncovered. The base member 1 is then submerged in a second sulfuric acid solution maintained at a constant temperature between the ranges 20° C. to 40° C., for example at about 30° C., and having a specific gravity of substantially 1.4. The base member 1 is then anodized to form upon the acid exposed surface 2*b* the moisture sensitive oxide film 4, as shown in FIG. 3.

The anodization step is as before described and again lasts for approximately thirty minutes whereafter the base member 1 is cleansed of the second acid solution and the second acid resistive coating in the manner before explained. The base member 1 is then submerged in boiling distilled water for approximately thirty minutes to age and thereby stabilize the response characteristics of the now formed moisture sensitive aluminum oxide film 4. The moisture sensitive oxide film 4 is characterized by being soft, porous, non-sensitive to temperature or pressure, but having a moisture responsive variable impedance characteristic. The impedance characteristic of the film 4 varies inversely as a function of the relative concentration of the moisture present in the ambient to which the film is exposed.

Figure 4:
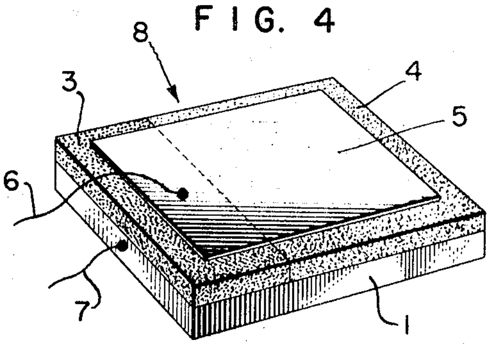
FIG. 4 is a perspective view of an embodiment of a moisture sensing element according to the present invention as made from the base member shown in FIG. 3.

To complete the manufacture of the embodiment of the present invention thus far described, a porous metal film 5, such as gold, is then formed over the moisture sensitive oxide film 4 and overlapped onto the insulative oxide film 3. This metal film may be formed over the oxide films, for example, by suitably adhering a gold foil thereto, by depositing by evaporation or sputtering a gold film thereon, or by other well known techniques. The thickness of the gold film 5 is controlled so that the gold film 5 remains permeable to moisture. An electrical terminal is then attached, i.e. electrically connected to the portion of the metal film 5 overlapping onto the insulative oxide film 3. A second electrical terminal 7 is attached or electrically connected directly with the base member 1. Thus, a moisture sensitive element 8, as illustrated in FIG. 4, is formed in accordance with the present invention.

It is noted in relation to the above-described method for manufacturing the sensing element 8 that while aluminum was used as the base member 1 other suitable oxide forming materials could also be employed. The criterion of suitability for such materials being that they are electrically conductive, and that insulative and moisture sensitive oxide films may each be selectively formed thereon by anodizing the materials in acid baths of different controlled temperatures. The metal film 5 which was formed of gold may also be made of other satisfactory electrically conductive materials such as aluminum, copper, platinum, silver or their equivalents providing the film 5 remains permeable to moisture. Carbon could also be brushed on the oxide film 4 and overlapped onto the oxide film 3 to form a conductive and moisture permeable film which would serve as a substitute for the metal film 5. Concerning the steps for anodizing the base member 1, acid solutions other than sulfuric acid could be employed and the volume of acid in such solutions may be varied. While alternating current is preferred, direct current may also be used in the anodizing process, and the current density may be appropriately varied.

The period of time during which the base member 1 is anodized to form each of the oxide films 3 and 4 may be varied from the above suggested thirty minute periods, thereby to control the thickness of the oxide films formed. The films 3 and 4, however, must be formed so as to be mutually contiguous, making a continuous, i.e. uninterrupted interface, and smooth junction with each other. To this end a narrow border area on the oxide film 3 of about 0.001 to 0.015 inch width and adjacent to the surface area 2*a* may be deliberately not covered with the second acid resistive coating in the second anodization step. In this manner, the oxide film 4, when formed, will tend to overlap onto the film 3, thereby insuring that an uninterrupted interface and smooth junction are formed between the films 3 and 4. The formation of such a smooth junction between the films 3 and 4 is necessary in order to avoid the introduction of irregularities into the film 5 when it is formed across this junction. Irregularities in the film 5 must be avoided since they frequently introduce unwanted internal resistance into the moisture sensing element.

Figure 5:
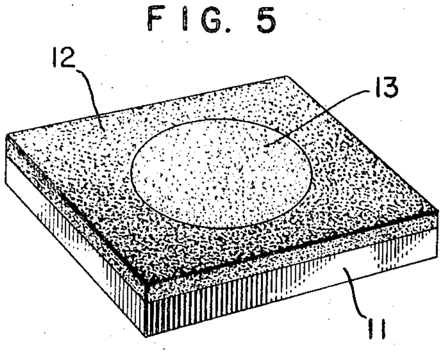
FIG. 5 is a perspective view of a metal base member with a moisture sensitive oxide film and a surrounding insulative oxide film formed thereon.
Figure 6:
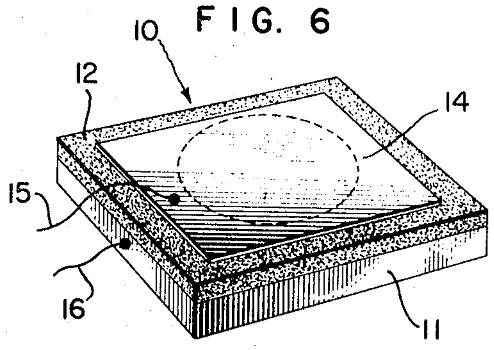
FIG. 6 is a perspective view of a second embodiment of a moisture sensing element according to the present invention as made from the base member shown in FIG. 5.

A second embodiment of the present invention as may be manufactured by the above-described method is shown in FIGS. 5 and 6. A moisture sensing element 10 is shown therein comprised of a rectangular base member 11 made of substantially pure sheet aluminum. An insulative oxide film 12 and a circular moisture sensitive oxide film 13 are formed on one side of the base member 11 with the film 12 surrounding the film 13. The oxide films 12 and 13 are further formed as in the first embodiment of the invention to be contiguous, making a continuous interface and smooth junction with each other. A porous gold film 14, permeable to moisture, is formed on the oxide films 12 and 13 so as to cover the oxide film 13 and to overlap onto the oxide film 12. An electrical terminal is connected to a portion of the gold film 14 which overlaps onto the insulative oxide film 12. An electrical terminal 16 is connected directly with the base member 11.

Thus, there has been provided an improved moisture or humidity sensing element which exhibits a moisture responsive variable impedance characteristic and is characterized by its rapid time of response, low internal resistance, durable construction and stable response characteristics.

The embodiments of the invention in which an exclusive property or privilege is claimed are defined as follows:

1. A moisture sensing element which exhibits a moisture responsive variable impedance characteristic, said moisture sensing element comprising:

- a metal base member having a substantially flat surface area;
- a moisture sensitive oxide film formed upon a first portion of said flat surface area, said moisture sensitive oxide film having a substantially smooth surface and exhibiting a moisture responsive variable impedance characteristic;
- an insulative oxide film formed upon a second portion of said flat surface area contiguous with said moisture sensitive oxide film, said insulative oxide film having a substantially smooth surface and forming a continuous interface and smooth junction with said moisture sensitive oxide film;
- an electrically conductive and moisture permeable film, said conductive film being formed over said smooth surface of said moisture sensitive oxide film and overlapping onto a portion of said smooth surface of said insulative oxide film;

first and second electrical terminals, said first terminal being connected to the portion of said conductive film overlapping onto said insulative oxide film, said second terminal being connected to said metal base member.

2. The invention recited in claim 1 wherein said insulative oxide film surrounds said moisture sensitive oxide film.

3. A method for making a moisture sensing element comprising:

covering a metal base member with a first acid resistive coating while leaving uncovered a first portion of a flat surface area of said base member;

submerging said base member in a first acid solution maintained at a first predetermined temperature in the range of about −5° C. to +5° C.;

passing electrical current through said first acid solution to form on said first portion of said flat surface area an insulative oxide film;

cleansing said base member of said first acid solution and said first acid resistive coating;

covering said base member with a second acid resistive coating while leaving uncovered a second portion of said flat surface area adjacent to said first portion;

submerging said base member in a second acid solution maintained at a second predetermined temperature in the range of about +20° C. to +40° C.;

passing electrical current through said second acid solution to form on said second portion of said flat surface area a moisture sensitive oxide film which makes a continuous interface and smooth junction with said insulative oxide film;

cleansing said base member of said second acid solution and said second acid resistive coating;

forming an electrically conductive and moisture permeable film over the surface area of said moisture sensitive oxide film and overlapping onto the surface area of said insulative oxide film;

attaching a first electrical terminal to the portion of said conductive film overlapping onto said insulative oxide film; and attaching a second electrical terminal to said base member.

4. The method recited in claim 3 wherein said first and second acid solutions are sulphuric acid solutions.

5. The method recited in claim 4 wherein said sulphuric acid solutions are comprised of about 50% sulphuric acid by volume.

6. The method recited in claim 3 wherein:

said metal base member is aluminum; and said conductive film is formed by evaporatively depositing a metal selected from the group consisting of aluminum, copper, gold, platinum and silver.

7. The method recited in claim 6 wherein each step of cleansing said base member comprises:

rinsing said base member in water to remove said acid solutions;

rinsing said base member in a solvent effective to remove said acid resistive coatings; and submerging said base member in boiling distilled water to age said moisture sensing element.

8. The method recited in claim 7 wherein said first and second acid solutions are comprised of about 50% sulphuric acid by volume.

9. The method recited in claim 3 wherein the step of covering said base member with a second acid resistive coating includes leaving uncovered a border area of about 0.001 to 0.015 inch width of said insulative oxide film which is adjacent to said second portion of said flat surface area.

10. The method recited in claim 3 wherein:

the first predetermined temperature is 0° C.; and the second predetermined temperature is 30° C.

11. The method recited in claim 3 wherein:

said metal base member is aluminum; and said conductive film is formed by applying a moisture permeable carbon film onto the surface area of said moisture sensitive oxide film and overlapping onto the surface area of said insulative oxide film.

12. The method recited in claim 3 wherein:

said metal base member is aluminum; and said conductive film is formed by depositing by sputtering a metal selected from the group consisting of aluminum, copper, gold, platinum and silver.

References Cited

UNITED STATES PATENTS 2,237,006 4/1941 Koller -------------- 338—35

RODNEY D. BENNETT, Primary Examiner

J. G. BAXTER, Assistant Examiner

U.S. Cl. X.R.

29—620; 338—35